United States Patent
Yamazaki

(10) Patent No.: US 7,016,072 B1
(45) Date of Patent: Mar. 21, 2006

(54) IMAGE READING METHOD AND IMAGE READING APPARATUS

(75) Inventor: Yoshirou Yamazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/359,566

(22) Filed: Jul. 22, 1999

(30) Foreign Application Priority Data

Jul. 22, 1998 (JP) ................... 10-206041

(51) Int. Cl.
  *G06F 15/00* (2006.01)
(52) U.S. Cl. .................. 358/1.9; 358/504; 358/505
(58) Field of Classification Search ................ 358/505, 358/509, 510, 515, 516, 1.9, 518, 504, 487
See application file for complete search history.

(56) References Cited

U.S. PATENT DOCUMENTS

| | | | |
|---|---|---|---|
| 5,264,948 A * | 11/1993 | Imoto | 358/474 |
| 5,579,131 A | 11/1996 | Kusumoto et al. | |
| 5,745,262 A * | 4/1998 | Tatsumi | 358/504 |
| 5,912,724 A * | 6/1999 | Sakaguchi | 355/35 |
| 6,233,059 B1 * | 5/2001 | Kodaira et al. | 358/1.9 |

FOREIGN PATENT DOCUMENTS

| | | |
|---|---|---|
| JP | 3-113963 A | 5/1991 |
| JP | 5-191661 A | 7/1993 |
| JP | 7-303167 A | 11/1995 |
| JP | 9-163070 A | 6/1997 |

* cited by examiner

*Primary Examiner*—Twyler Lamb
(74) *Attorney, Agent, or Firm*—Birch, Stewart, Kolasch & Birch, LLP

(57) ABSTRACT

There is provided an image reading method, comprising the steps of reading photoelectrically an original image with an image sensor by separating it into three primary colors and converting image signals of the three primary colors outputted from the image sensor into digital signals, wherein light quantity of light which is incident on the image sensor is balanced with every color in accordance with an original type. When the image is photoelectrically read, the high-precision image reading can be attained without creating a muddy color. Moreover, the image reading conditions need not be changed, even when the film types are changed.

20 Claims, 14 Drawing Sheets

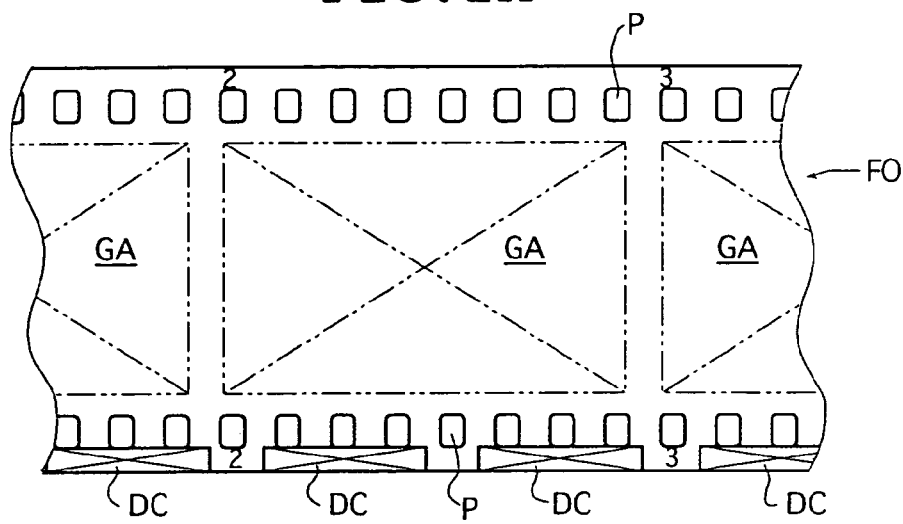
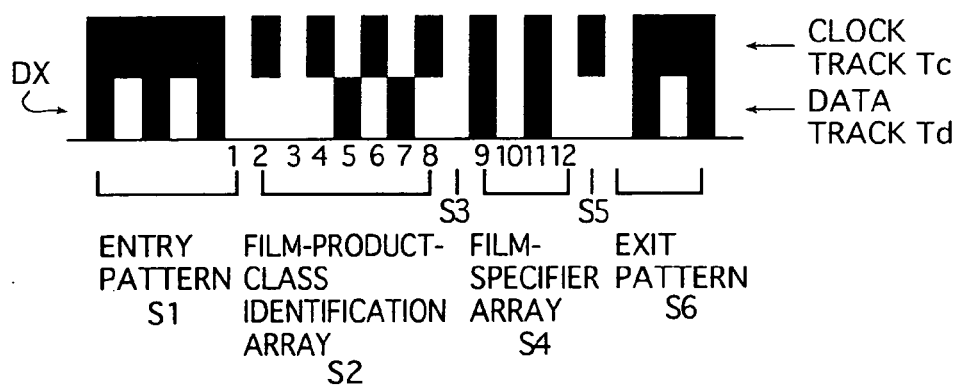
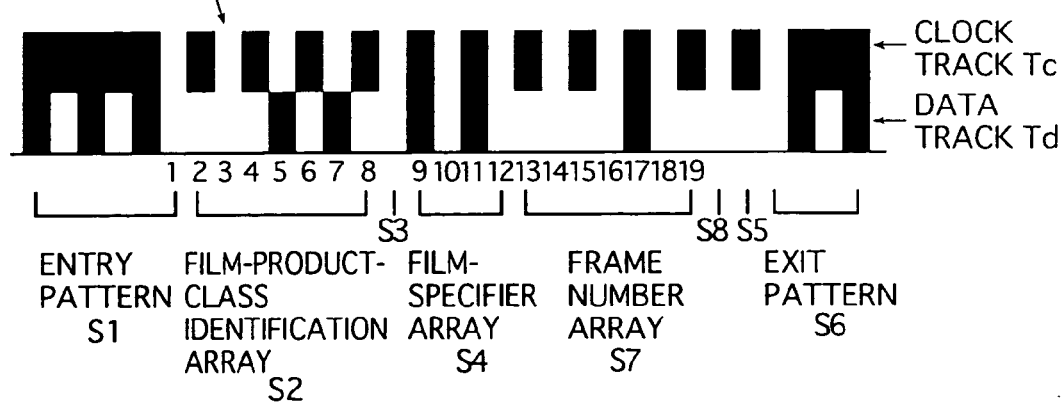

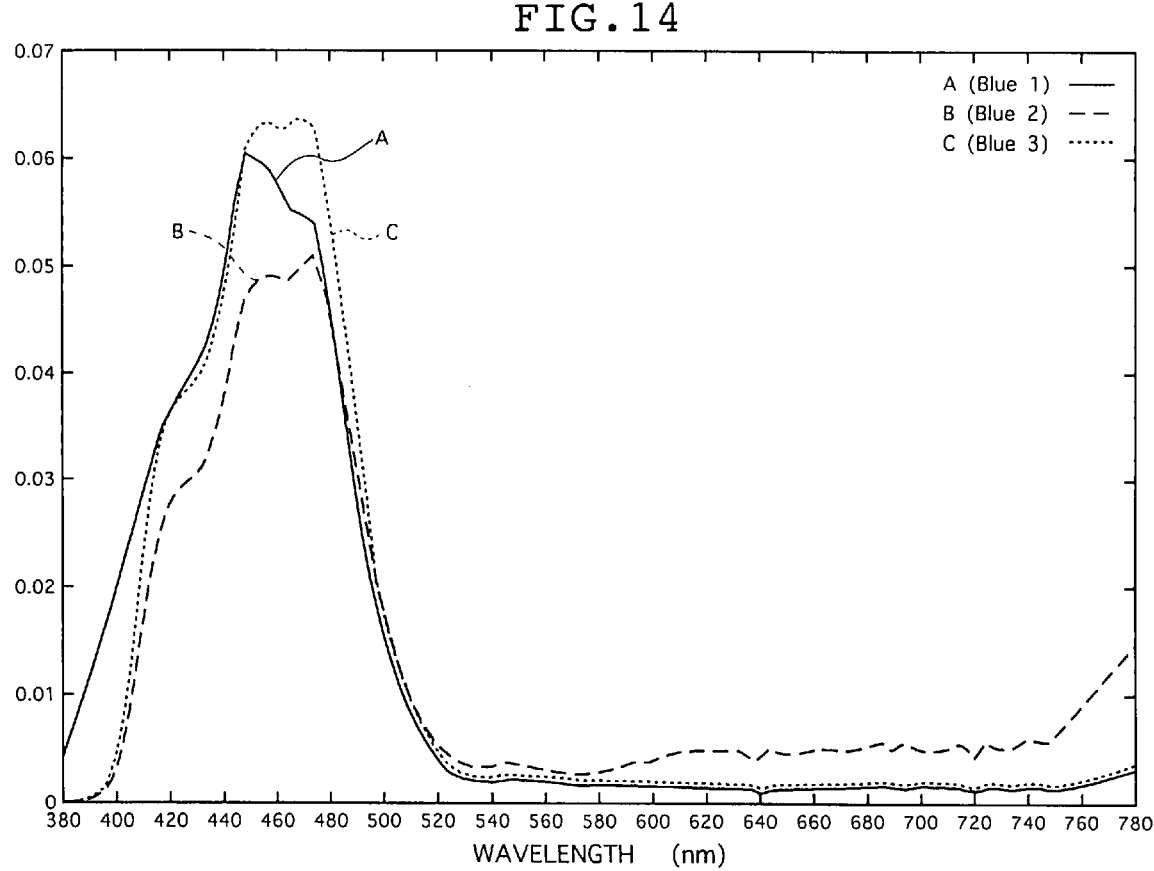

IMAGE READING METHOD AND IMAGE READING APPARATUS

BACKGROUND OF THE INVENTION

The present invention relates to the technical field of a method and an apparatus for photoelectrically reading original images, particularly images recorded on photographic films.

At present, most of the images recorded on photographic films such as negatives and reversals (which are hereinafter referred to simply as "films") are printed onto light-sensitive materials (photographic papers) by a technique generally called "direct exposure (analog exposure) in which the light-sensitive materials are exposed with the light protected from the films.

On the other hand, a printer which adopts a technique generally called "digital exposure", that is, a color digital printer, has recently been commercialized. In this "color digital printer", the image recorded on a film is read photoelectrically and converted into digital signals which are subjected to various kinds of image processing to produce recording image data; a light-sensitive material is scanned and exposed with recording light modulated in accordance with the thus produced recording image data thereby recording a (latent) image which is then made to a (finished) print.

In the color digital printer, since an image can be made to digital image data and exposure conditions used in printing can be determined by subjecting the digital image data to image data processing, a high-quality print which has not been obtained by the conventional direct exposure can be obtained by preferably executing the correction of a washed out highlight and a dull shadow due to photography with back light and an electronic flash, sharpening processing and the like. Further, a plurality of images can be composited to a single image or one image can be split into segments through the image data processing. In addition, a print can be outputted after it is optionally subjected to editing and processing in accordance with uses thereof.

Outputting the image as a print (photograph) is not the sole capability of the color digital printer; the image data can be supplied into a computer or the like and stored in recording media such as a floppy disk; hence, the image data can be put to various non-photographic uses.

The color digital printer is basically composed of: a scanner that renders reading light incident on a film and photoelectrically reads the resultant projected light with an image sensor such as a CCD line sensor thereby reading an image recorded on the film; an image processing apparatus that performs specified image processing on image data captured by the scanner or supplied from a digital camera or the like to produce image data for image recording, that is, an exposure condition; a printer (image recording apparatus) that forms a latent image on a light-sensitive material by scan exposing it with, for example, a light beam in accordance with the image data outputted from the image processing apparatus; and a processor (developing apparatus) that performs development processing on the light-sensitive material exposed by the printer to produce a (finished) print on which the image is reproduced.

It is preferable that such a color digital printer can basically process both negative-type and positive-type originals, specifically, a color negative film and a color reversal film. That is, it is preferable that the print on which the high-quality image has been reproduced can be outputted from both of the color negative and color reversal films. For attaining this, it is necessary to obtain image information which is as accurate as possible from the film as the original.

Here, a problem lies in that a big difference in color balance (light quantity balance) of the image information read by the scanner (image sensor) exists between the color negative film and the color reversal film.

In other words, a sensor system which composes the scanner (image sensor) is generally suitable for white color so that it is good for reading the color reversal film as it is. However, since a base density of the color negative film greatly differs from that of the color reversal film, a problem is created when the color negative film is read in that the color balance (light quantity balance) of image information of the color negative film read by the scanner (image sensor) greatly differs from that of the color reversal film. This problem is generated only when a so-called three-color simultaneous reading is performed and is not generated when three colors are separately read in order.

This will be described in detail below.

FIG. 5 shows an example of spectral sensitivity of a sensor system composing a scanner (image sensor). As is apparent from the figure, an image sensor for B (blue) light has sensitivity also for G (green) and R (red) light, which becomes a cause of cross talk described below.

FIG. 6 shows spectral transmittance of a base of a representative color negative film. A case in which an image formed on the base having spectral transmittance as shown in FIG. 6 is read by the scanner (image sensor) having spectral sensitivity as shown in FIG. 5 is row described herein.

In this case, the light quantity balance is adjusted among three primary colors by conventional known methods such as a method in which the storage time in each CCD sensor is changed for each color so as to align the CCD output voltages, a method in which each CCD output voltage is aligned by amplification, and the like.

Under such a condition, the above-mentioned two characteristics are combined to create spectral sensitivity characteristics as shown in FIG. 7. In such characteristics, the image sensor has a cross talk (tailing portion of long wavelength side B in FIG. 7) of spectral sensitivity; hence, a new problem which causes a remarkably muddy color is generated.

Apart from the above problem, a big difference in peak values of spectral densities (particularly in R (red color))of the color negative and color reversal films exists as shown in FIG. 9 (color negative film) and FIG. 10 (color reversal film).

Same with the case that the color balances (light quantity balance) of respective image information are different from each other, the above big difference will cause another problem that a completely different reading condition such as the light quantity balance including a light source or the like is necessary to be separately set depending on whether an image on the color reversal is read or an image on the color negative films is read.

SUMMARY OF THE INVENTION

An object, therefore, of the present invention is to solve the above-mentioned prior art problems and to provide an image reading method in which a light quantity balance of a sensor system composing a scanner (image sensor) is adjusted in accordance with a film type to be used as the original so as to be capable of high-precision image reading without creating a problem that a muddy color is generated, and an image reading apparatus adopting the method.

Another object of the invention is to provide an image reading method which need not change the image reading condition as described above, and an image reading apparatus adopting the method.

The stated objects of the invention can be attained by an image reading method, comprising the steps of:

reading photoelectrically an original image with an image sensor by separating it into three primary colors; and converting image signals of the three primary colors outputted from the image sensor into digital signals, wherein light quantity of light which is incident on said image sensor is balanced with every color in accordance with an original type.

It is preferable that balancing said light-quantity with every color is formed by changing an optical balance is an optical system from a light source to the image sensor including an original.

It is also preferable that the original type includes at least a color negative film and a color reversal film.

On the other hand, an image reading apparatus according to the invention comprises an image sensor which separates into three primary colors light bearing an image of an original and photoelectrically reads said light, an original type acquiring means for detecting or setting an original type of said original and light quantity balance adjusting means for catching with every color a balance of light quantity of said light that is incident on said image sensor with every color in accordance with the original type obtained by said original type acquiring means.

It is preferable that the light quantity balance adjusting means changes an optical balance in an optical system from a light source to the image sensor including said original.

It is also preferable that the light quantity balance adjusting means changes the optical balance in the optical system from the light source to the image sensor including said original and decreases color mixing in the three primary colors.

It is further preferable that the above-mentioned light quantity balance adjusting means includes an optical filter, as well as the above-mentioned original type includes at least a color negative film and a color reversal film. Furthermore, the above-mentioned light quantity balance adjusting means will not operate in a reference type of the original.

Moreover, the image reading apparatus according to the invention further comprises spectral sensitivity changing means for changing a spectral sensitivity distribution of said light in accordance with the original type after the balance of the light quantity is adjusted with every color, as well as said respective means. It is preferable that this spectral sensitivity changing means is peak value changing means of the spectral sensitivity distribution in accordance with the original type. It is also preferable that the above-mentioned peak value changing means of the spectral sensitivity distribution changes a peak value of the spectral sensitivity distribution in an optical system from a light source to the image sensor including the original.

It is further preferable that the above-mentioned light quantity balance adjusting means and the above-mentioned peak value changing means of the spectral sensitivity distribution are integrated into a single optical unit.

The above-mentioned peak value changing means of the spectral sensitivity distribution will not operate in a reference type of the original.

In the image reading method and the image reading apparatus according to the invention, for example, a light quantity balance adjusting filter having a characteristic as shown in FIG. 8 (a spectral transmittance characteristic reverse to that of the base of the above-mentioned representative color negative film as shown in FIG. 6) is used as an example of the light quantity balance adjusting means. However, the invention is by no means limited to the above device.

In the image reading method and the image reading apparatus according to the invention, the light quantity balance adjustment for the scanner (image sensor) is realized in accordance with the original type by inserting or withdrawing the above-mentioned light quantity balance adjusting filter in or from the light path of the scanner (image sensor) in accordance with the original type. However, a method including changing of light sources in which luminescence wavelength distribution of the light source is changed is also available.

Moreover, in the image reading method and the image reading apparatus according to the invention, the color negative film and the color reversal film which have spectral density distributions as shown in FIGS. 9 and 10 can be changed so as to have spectral density distributions as shown in FIGS. 11 and 12 by using a notch filter in addition to the light quantity balance adjusting filter. By this, in reading the color negative film and the color reversal film, it is capable of making roughly uniform the wavelength corresponding to the peak value of the spectral density distribution for each color, thereby allowing the later image processing to be efficiently performed.

A filter which cuts 550–650 nm and a filter which cuts 560–630 nm are used, as the above-mentioned notch filter, in the cases of color negative filter as shown in FIG. 9, and color reversal film as shown in FIG. 10, respectively.

BRIEF DESCRIPTION OF THE DRAWINGS

FIG. 2A is a schematic view showing a recording position DC of a DX code DX or an expanded DX code DXe of 135 negative film;

FIGS. 2B and 2C illustrate examples of two codes, DX code DX and expanded DX code Dxe, respectively;

FIG. 14 is a graph showing a comparison of three conditions of B (blue) of color negative film: original spectral sensitivity; when light quantity balance is not adjusted by light quantity adjusting filter 26; and when light quantity balance is adjusted.

DETAILED DESCRIPTION OF THE INVENTION

The image reading method and the image reading apparatus of the invention are now described in detail below with reference to the preferred embodiments shown in the accompanying drawings.

First, a DX code and an expanded DX code which are used for identifying a film type in a color digital printer according to an embodiment as described below will now be described.

FIG. 2A is a schematic view showing a recording position DC of a DX code DX or an expanded DX code DXe of 135 negative film; FIGS. 2B and 2C illustrate examples of two codes, that is, a DX code DX and an expanded DX code Dxe, respectively.

As shown in FIG. 2A, when a negative film F0 of 135 size is placed with the emulsion coated side down and the frame number increasing from left to right of the figure, the DX code DX or the expanded DX code DXe is recorded in two portions for an image region GA of each frame with an ordinary full size at the bottom edge in the figure, that is, in the bottom edge region DC below perforation holes P. Therefore, these codes are recorded by one for the image field of every frame of half-cut size.

As shown in FIGS. 2B and 2C, each of the DX code DX and the expanded DX code DXe is composed of dual tracks: clock track Tc in the upper half; data track Td in the lower half. The DX code DX and the expanded DX code DXe are 23-bit and 31-bit bar codes, respectively, each comprising, in order from the left in the figure, an entry pattern (6-bit) S1 indicating the beginning of the code sequence, a film-product-class identification array (7-bit) S2 indicating a film manufacturer and a film type, an unassigned bit (1-bit) S3, a film-specification-array (4-bit) S4 indicating the emulsifier number of the film and so forth, a parity bit (1-bit) S5 and an exit pattern (4-bit) S6 indicating the end of the code sequence. The expanded DX code DXe, in addition to the above patterns and bits, includes further a frame number array (7-bit) S7 and a second unassigned bit (1-bit) S8 between the film-specification-array S4 and the parity bit 55 of the DX code DX. By means of the above-mentioned DX code DX and the expanded DX code DXe and so forth, information on the film such as the manufacturer, the type, the emulsifier number and the like can be obtained whereupon a printing condition on a photographic paper in accordance with the film or an image processing condition can be established to obtain an appropriately processed finished print.

Figure 1:
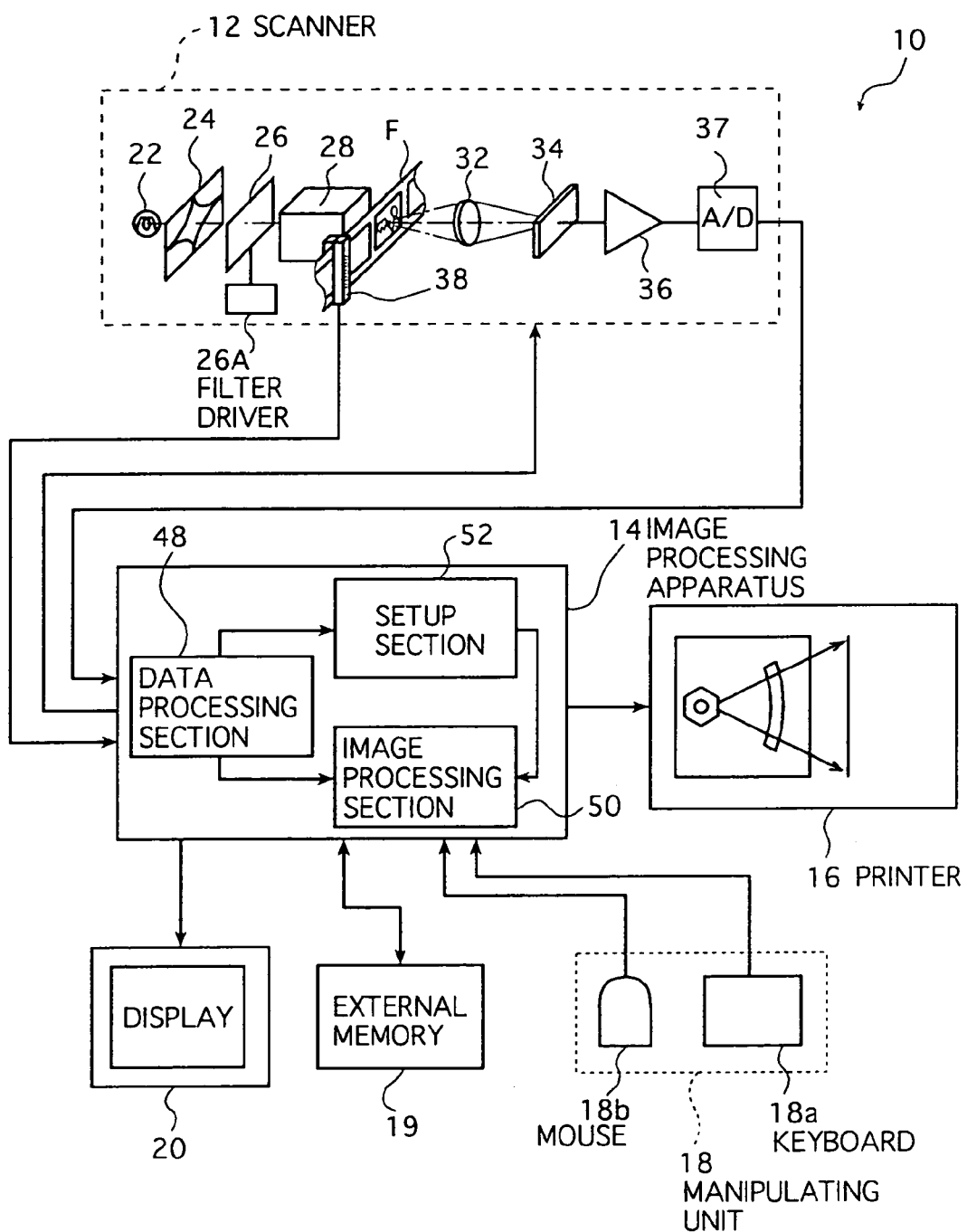
FIG. 1 is a block diagram showing an example of a color digital printer using an image reading method according to an embodiment of the invention.

FIG. 1 is a block diagram showing an example of a color digital printer using an image reading method according to an embodiment of the invention.

It should be noted that the embodiment to be described below is an example when the above-mentioned DX code is used as information for identifying the film type.

The color digital printer 10 shown in FIG. 1 is essentially composed of a scanner 12 which photoelectrically reads an image and the above-mentioned DX code recorded on a film F, an image processing apparatus 14 which manipulates and controls the color digital printer 10 in its entirety according to the present embodiment, and performs the image processing of the read image data, a printer 16 which exposes imagewise a light-sensitive material (photographic paper) with a light beam modulated in accordance with the image data outputted from the image processing apparatus 14 and subjects the thus exposed light-sensitive material to development processing to produce a finished print. The scanner 12 and the image processing apparatus 14 compose the image reading unit according to the present invention.

Connected to the image processing apparatus 14 are a manipulating unit 18 having a keyboard 18a and a mouse 18b for inputting (setting) various conditions, selecting and commanding a specific processing step and entering a command and so forth for effecting color/density correction, an external memory 19 for storing data or processing program necessary for performing the image reading method of the invention such as the film type indicated with the read DX code and the corresponding image processing condition and the like, as well as a display 20 for representing the image captured with the scanner 12, various manipulative commands and pictures for setting and registering various conditions.

The scanner 12 is an apparatus with which the images recorded on the film F are read photoelectrically frame by frame. It comprises a light source 22, a variable diaphragm 24, a light quantity adjusting filter 26 which functions as a light quantity balance adjusting device for adjusting a light quantity balance among three primary colors according to the invention, a diffuser box 28 which diffuses the reading light incident on the film F so that it becomes uniform across the plane of the film F, an imaging lens unit 32, an image sensor 34 having line CCD sensors capable of reading R (red), G (green) and B (blue) images, an amplifier (Amp) 36, an analog/digital (A/D) converter 37 and an bar code reader 38 with which a DX code DX and an expanded DX code DXe recorded in an edge of the Film F are photoelectrically read. The above-mentioned light quantity adjusting filter 26 is constructed such that it is capable of being inserted in and withdrawn from the reading light path passing through the film F with a light quantity adjusting filter driver (hereinafter called as "filter driver") 26A.

In the illustrated color digital printer 10, dedicated carriers are available that can be loaded into the body of the scanner 12 in accordance with the type or the size of the film used (e.g. whether it is a negative (or reversal) film of 135 size or 240 size), the format of the film F (e.g. whether it is a strip or a slide), the type of processing such as trimming or the like, or other factors. By replacing one carrier with another, the color digital printer 10 can be adapted to process various kinds of films in various modes. The images (frames) that are recorded on the film F and which are subjected to the necessary procedure for print production are transported to and held in a specified reading position by means of the carriers. The bar code reader 38 is mounted on the carrier at the upstream side of the specified reading position along the transport direction whereby it photoelectrically reads the DX code when the film F is transported to the specified reading position.

In the film F of 240 size, magnetic information is further read from a magnetic track.

Figure 3:
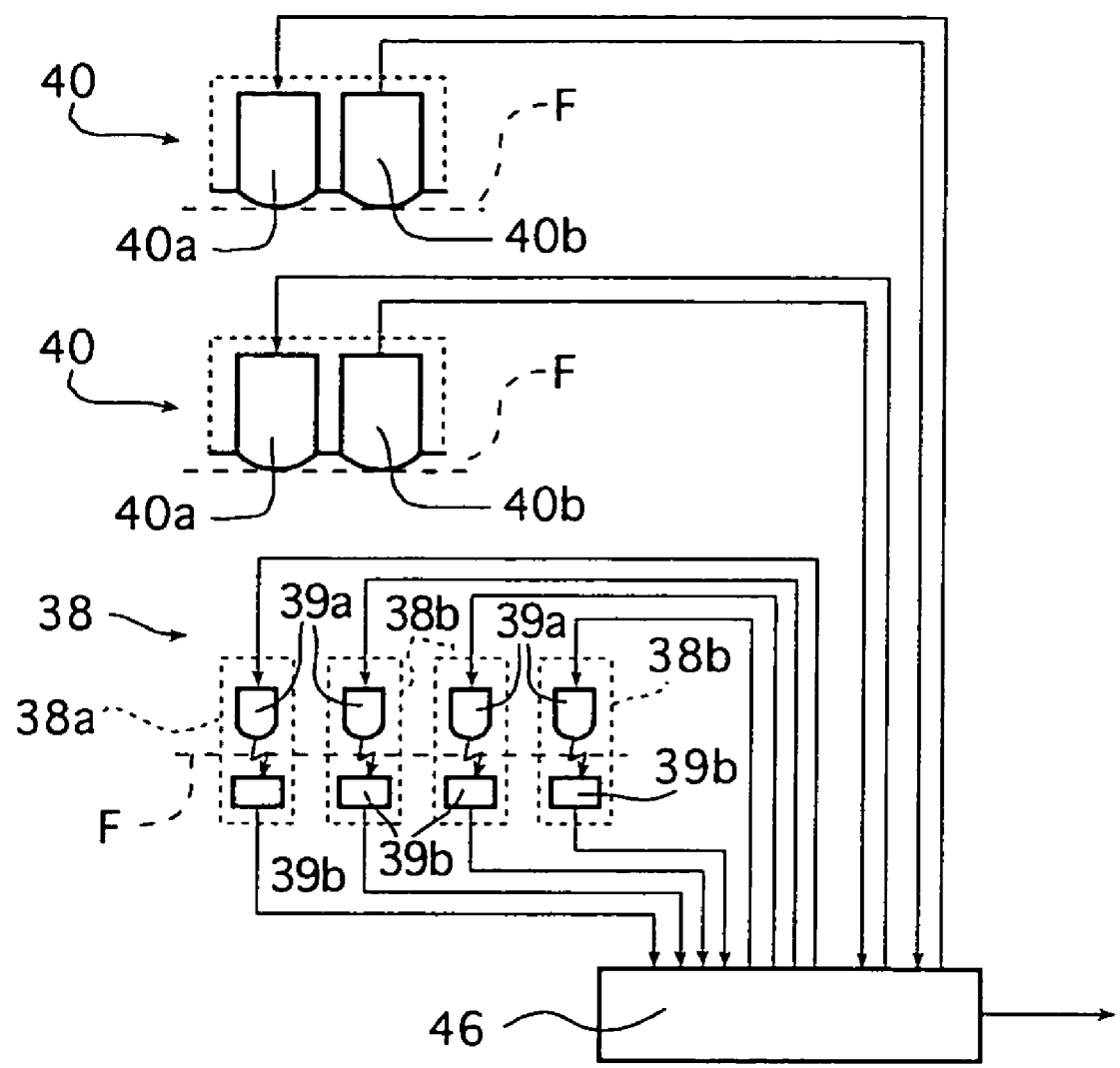
FIG. 3 illustrates an example of a bar code reader provided in a scanner of the color digital printer shown in FIG. 1.
Figure 4A:
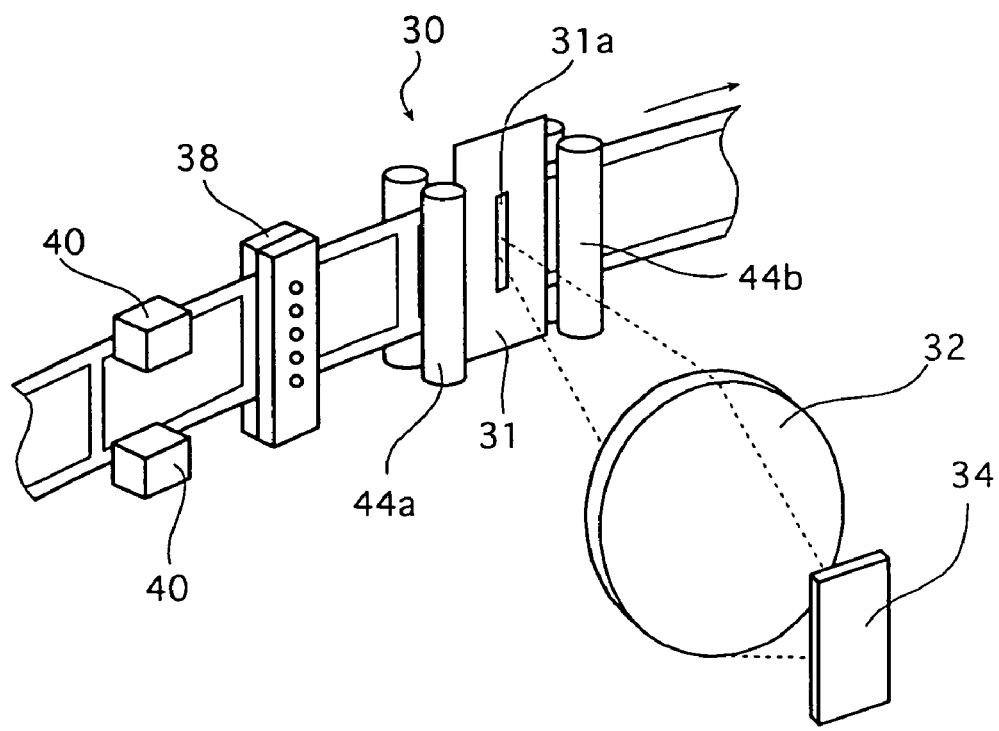
FIG. 4A is a diagrammatic perspective view showing a carrier which is an essential part of the scanner.
Figure 4B:
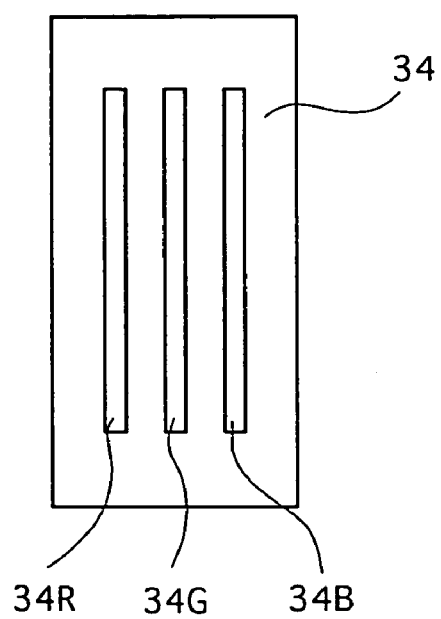
FIG. 4B is a diagrammatic view showing a CCD sensor which is an essential part of the scanner.
Figure 5:
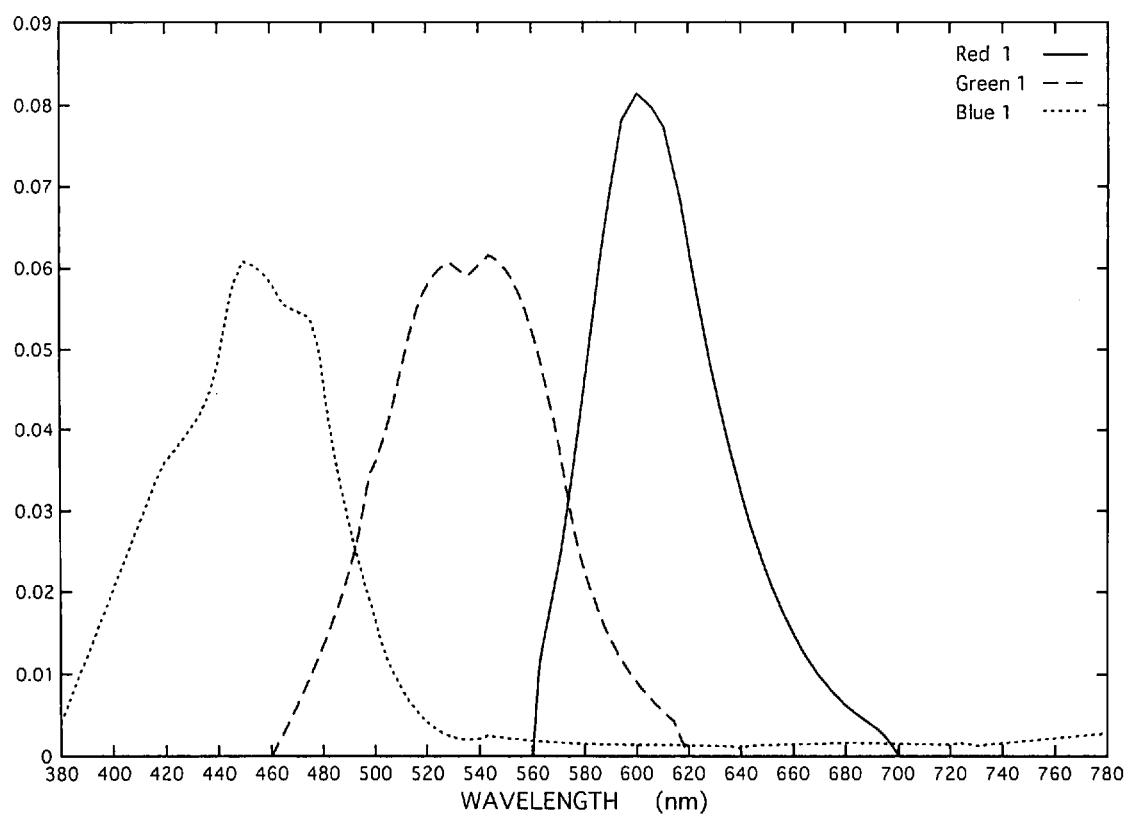
FIG. 5 is a graph showing an example of spectral sensitivity of an image sensor system composing the scanner.
Figure 6:
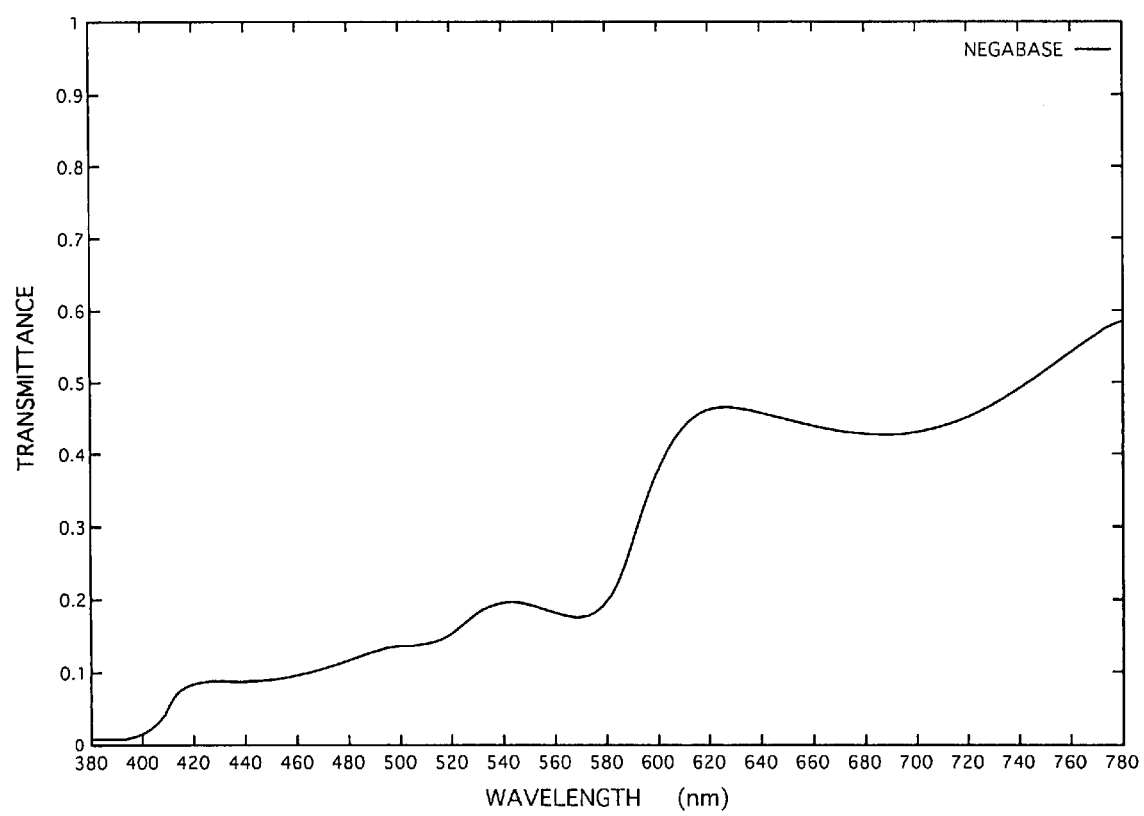
FIG. 6 is a graph showing spectral transmittance of a base of a representative color negative film.

FIG. 3 illustrates the bar code reader 38 provided in the scanner 12 of the color digital printer 10 according to the present embodiment in detail. FIGS. 4A and 4B show in detail a carrier 30 and the image sensor (hereinafter also called as a CCD sensor) 34 forming essential parts of the scanner 12, respectively.

The film F is transported intermittently with transport roller pairs 44a and 44b which are each provided either on upstream and downstream sides along the transport direction of a carrier mask 31 which has an aperture 31a for determining the reading position and size of the film F. The bar code reader 38 comprises an optical sensor 38a as a bar code reader head which is provided along the width direction of the film F to be transported in the upstream neighborhood of the transport roller pair 44a disposed at the upstream side of the carrier mask 31 and a plurality of other optical sensors 38b. Each of the optical sensors 38a and 38b is provided with a light-emitting portion 39a and an associated light-receiving portion 39b on upper ard under sides of the film F (shown in a dashed line) which is transported through a film transport path.

The optical sensor 38a which is provided on one end portion of the film F along the width direction thereof is used for reading optical information such as the DX code and the like as well as detecting the perforation hole P, advancing and tailing ends and the like of the film F. On the other hand, the optical sensors 36b which are provided facing to the middle portion of the film along the width direction thereof are used for detecting an image region GA and an area between image regions, that is, a non-image region between frames. The optical sensors 38b are also used in automatic transport of the film F or continuous transport and reading of a plurality of frames with line sensors which will be described later.

The magnetic heads 40 are mounted on a carrier which is adapted to the film F of 240 size. The magnetic heads 40 are mounted on the magnetic tracks MT provided on both ends of the film F so as to face to each other in the further upstream side of the bar code reader 38 in the transport direction. Each of the magnetic track 40 comprises a recording head 40a which records the magnetic information in one of the magnetic tracks MT and a reading head 40b which reads the magnetic information recorded in one of the magnetic tracks MT.

The bar code reader 38 and the magnetic heads 40 in such a composition are connected to a controller 46 provided in the scanner 12. The controller 46 is also connected to a motor driving the transport roller pairs 44a and 44b of the carrier 30 and the like shown in FIG. 4A, a solenoid which performs opening and closing of the mask (pressing the film down) 31 and the like. During the period in which the film F is transported or the frames are changed to the next frame with the transport roller pairs 44a and 44b controlled by this controller 46, the bar code reader 38 reads the optical information such as the DX code and the like of the film F; the recording heads 40a of the magnetic heads 40 record the magnetic information from the controller 46 which had received information from the image processing apparatus 14 on the magnetic tracks MT of the film F; and the reading heads 40b of the magnetic heads 40 read the magnetic information recorded on the film F.

The thus read optical information and magnetic information are outputted to the image processing apparatus 14 by way of the controller 46. The DX code read with the bar code reader 38 is changed into a numerical value or a code at the controller 46 to be obtained as an optical information on the film type, film manufacturer and the like in the image processing apparatus 14. It is preferable that reading and obtaining of the optical information or the magnetic information with the bar code reader 38 and the magnetic heads 40 are performed while the film is transported or the frames are changed to the next frame at the time of a prescan which reads images of the film F in a rough manner. However, the invention is not limited thereto and reading and obtaining may be performed at the time of a fine scan or with other dedicated apparatuses separately installed.

The scanner 12 to be used in the invention, as shown in FIG. 4b, performs image reading by slit scanning which reads the image while the film F is scan transported by means of the transport roller pairs 44a and 44b of the carrier, using three kinds of line CCD sensors (comprising 34R, 34G and 34B) corresponding to reading of respective three primary colors. Since the scanner 12 is capable of reading three colors of R, G and B concurrently, it is sufficient if each of the prescan and the fine scan is performed once. Even with, for example, the film F of 135 size in a piece or strip form or the film F of 240 size in a cartridge, an image reading operation can be simplified by performing reading once in a back and forward manner.

In other words, after the optical information (and magnetic information) in a frame of the film F has been read with the bar code reader 38 (and the magnetic heads 40), the scanner 12 performs reading of the image in the frame. In the scanner 12, a reading light which is issued from the light source 22, adjusted of its total light quantity by the variable diaphragm 24, adjusted of its light quantity balance among colors by passing through the light quantity adjusting filter 26 and diffused with the diffuser box 28 is allowed to be incident on one frame of the film F (hereinafter, the film F of 135 size being taken as a representative), passes through it to produce a projected light bearing the image recorded on this frame of the film F.

The projected light of the film F is focussed on the light-receiving plane of the CCD sensor 34 with the imaging lens unit 32, photoelectrically read with the CCD sensor 34 to produce output signals which are then amplified with the amplifier 36, converted to digital signals in the A/D converter 37 and sent to the image processing apparatus 14.

In the illustrated scanner 12, the reading light issued from the light source 22 is adjusted of the total light quantity thereof with the variable diaphragm 24 and then further adjusted of the light quantity balance among three colors with the light quantity adjusting filter 26 in accordance with the original type. In other words, the reading light is arranged in a way that, after it is adjusted to have no or little unevenness of light quantity among colors even when the original types are changed, it is incident on each of the line CCD sensors (34R, 34G and 34B) for R, G and B colors in the CCD sensor 341, whereupon the above-mentioned image reading is performed with the reading light of which the light quantity is balanced among colors before being incident on the respective line CCD sensors (34R, 34G and 34B) for R, G and B colors, such that the image in a frame can be separated into three primary colors R, G and B and concurrently captured with the CCD sensor 34.

In the color digital printer 10 according to the present embodiment, prior to the image reading (fine scan) for outputting a print P, prescan which reads the image at low resolution may be performed so as to determine an image processing condition and the like.

In the scanner 12, a setup section 52 in the image processing apparatus 14 determines whether the above-mentioned light quantity adjusting filter 26 is inserted in the light path L or not according to the images recorded on the film F and the like. This will be described in detail later.

The type of the above-mentioned filter driver 26A and the method of moving the light quantity adjusting filter 26 therewith are not limited in any particular way, as far as the light quantity adjusting filter 26 can be inserted in or withdrawn from the light path. As examples, various known plate moving devices such as a gear, a link mechanism, a rack-and-pinion, a screw driving, a cam and the like are available. Moreover, the light quantity adjusting filter 26 may be provided in the downstream side of the film F in the light advancing direction.

As the above-mentioned light quantity adjusting filter 26, any known filters may be applicable only if they can obtain a well-balanced light quantity of the reading light incident on the image sensor 34 among colors in accordance with the original type. Various kinds of devices, for example, optical filters such as a vapor deposited filter and a glass filter are available.

In the exemplary illustration, as the light quantity balance adjusting device according to the invention, the light quantity adjusting filter 26 which is inserted in and withdrawn from the light path of the reading light according to the original type is employed. However, the invention is not limited to the above filter and any devices may be available only if they can adjust the light quantity among colors according to the original type, thereby adjusting among colors the balance of the light quantity of the reading light to be incident on each of color sensors (for example, line CCD sensors 34R, 34G and 34B of R, G and B colors, respectively) of the image sensor 34 which read each color at the same time. For examples, a device comprising only the above-mentioned optical filter, a device comprising the optical filter and a light source, a device which is capable of adjusting the light quantity among colors at the light source are also available.

In the invention, for the balance of the light quantity of the reading light incident on the image sensor 34 among colors, it is preferable that a device including the light source 22 is used to adjust an optical balance of an optical system from the light source 22 up to the image sensor 34.

Figure 8:
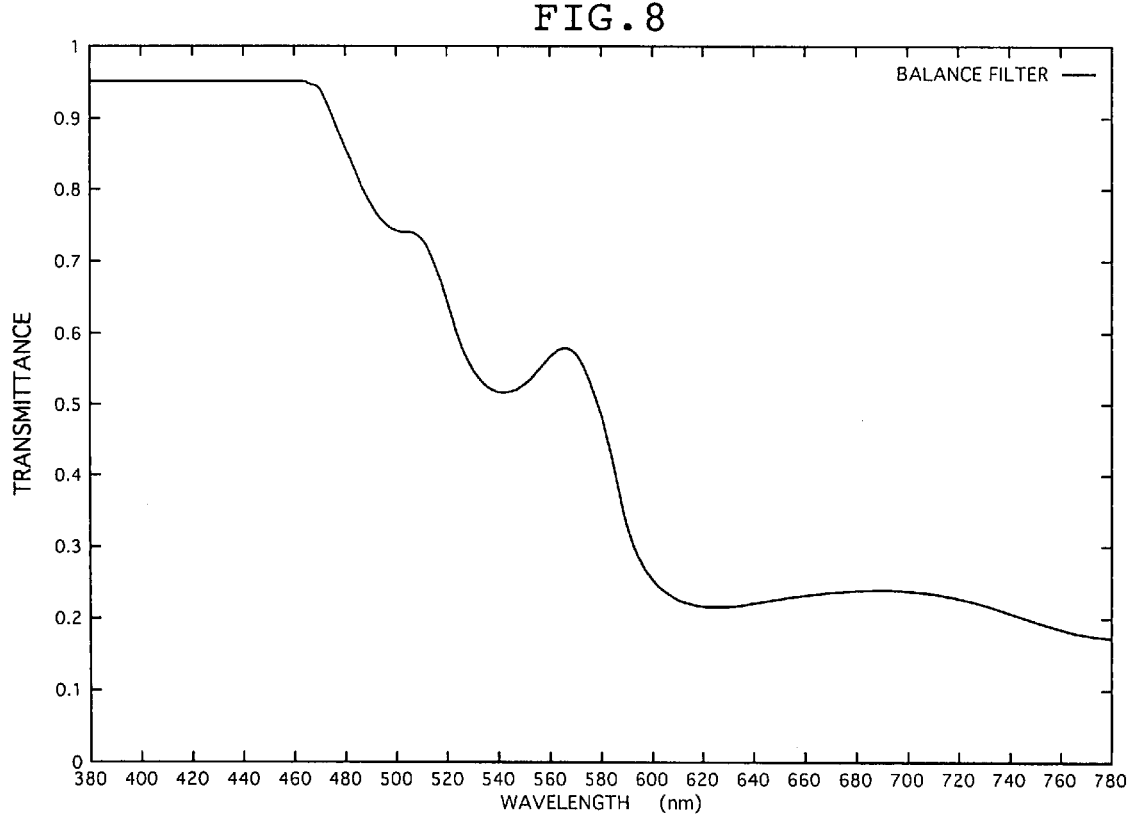
FIG. 8 is a graph showing an example of spectral transmittance of light quantity balance adjusting filter which is characteristic of the invention.

In an embodiment to be described below, as the light quantity adjusting filter 26 which functions as a light quantity balance adjusting device according to the invention as described above, a filter which has spectral transmittance characteristic as shown in FIG. 8 which is reverse to that of a color negative film base, is only used.

When the film F is read, the reading light is adjusted of the light quantity thereof among R, G and B colors with the light quantity adjusting filter 26, diffused with the diffuser box 28 making a uniform light on the plane of the film, allowed to be incident on the film F and passes through the film F to produce a projected light bearing an image recorded on the film F.

In the color digital printer 10, dedicated carriers are available that can be loaded into the body of the scanner 12 in accordance with the type or the size of the film used (e.g. whether it is a negative or reversal film of 135 size or 240 size), the format of the film (e.g. whether it is a strip or a slide) The images (frames) that are recorded on the film F and which are subjected to the necessary procedure for print production are transported to a specified reading position by means of the carriers.

As shown in FIG. 4A, the reading light is incident on the film F while it is held in the reading position and transported in an auxiliary scanning direction with the carrier 30. As a result, the film F is slit-scanned with the reading light passing through the slit 31a two-dimensionally.

As shown in FIG. 4b, the image sensor 34 is a so called 3-line color CCD sensor comprising a line CCD sensor 34R for reading an R image, a line CCD sensor 34G for reading a G image and a line CCD sensor 34B for reading a B image. The respective line CCD sensors extend in the main scanning direction as described above. The projected light from the film F is separated into three primary colors R, G and B by means of the image sensor 34 and captured photoelectrically.

Various kinds of information read with the bar code reader 38 mounted on the carrier 30 are optionally sent to specified sites in the image processing apparatus 14 and the like. Herein, the information on the film type is sent to the image processing apparatus 14.

As described above, the reading light passes through the film F held in the carrier 30 to produce a projected light bearing the image which is then focussed on the light-receiving plane of the image sensor 34 by means of the imaging lens unit 32.

The output signals (image signals) of the image sensor 34 are amplified with the amplifier 36, converted into digital image signals with the A/D converter 37 which are then sent to the image processing apparatus 14.

The setup section 52 of the image processing apparatus 14 decides the storage time (electronic shutter speed) of each line CCD sensor and the analog gain (amplification rate) at the amplifier 36 according to the image recorded on the film F and the like. This will be described in detail later.

In the scanner 12, the images recorded on the film F are captured by two scans, the first being prescan at low resolution and the second being fine scan for obtaining output image data.

The prescan is performed for all the images to be processed in the scanner 12 under a preset reading condition ensuring that the maximum value of the image signals to be converted with the A/D converter 37 become a specified value.

The fine scan, on the other hand, is performed under a reading condition for the fine scan ensuring that the maximum value of the image signals of the image in the pixel of interest to be converted with the A/D converter 37 become a specified value. This condition is set for each frame by using the image data obtained in the prescan. This will be also described in detail later his condition The specified values corresponding to the maximum values of the above-mentioned image signals in the prescan and fine scan may be the same with or different from each other. Moreover, pixel densities to be read in the prescan and fine scan are different from each other so that pixel densities to be read with each line CCD sensor and the transport speeds of the film F in the auxiliary direction in the prescan and fine scan are different from each other.

The prescan and fine scan are essentially the same except for these conditions.

The invention is preferably applicable not only to reading of the film F as in the illustrated example, but also to photoelectrical reading of a reflection original.

As described above, digital image signals from the scanner 12 are outputted to the image processing apparatus 14 (hereinafter called as processing apparatus 14).

The processing apparatus 14 comprises a data processing section 48, an image processing section 50 and the setup section 52. FIG. 1 shows only the sites related to image processing and, besides these sites, the processing apparatus 14 includes a CPU for controlling and managing the overall operation of the color digital printer 10 including the processing apparatus 14, memories for storing the information necessary for the operation and the like of the color digital printer 10 and so forth. The manipulating unit 18 and the display 20 are connected to related sites via the CPU (CPU bus) and the like.

The respective R, G and B digital image signals outputted from the scanner 12 are sent to the data processing section 48, where they are subjected to specified data processing steps such as dark correction, defective pixel correction, shading correction and the like. Thereafter, the processed digital signals are logarithmically converted to digital image data (density data).

The image data outputted from the data processing section 48 is subjected to specified image processing in the image processing section 50 and converted with a 3D (three-dimensional) LUT or the like into output image data corresponding to image recording with the printer 16 or image data corresponding to image representation on the display 20.

Image processing performed in the image processing section 50 is by no means limited in any particular way and various image processing steps performed in known image processing apparatus such as color balance adjustment, gradation adjustment, density adjustment, saturation adjustment, electronic magnification, dodging (compressing/extending the density's dynamic range), sharpening and the like are exemplified. These processing steps are performed by known methods using processing with a lookup table (LUT), a matrix (MTX) computing unit, a low-pass filter, an adder, a subtracter, a multiplier or the like, or averaging and interpolating operations and the like which are performed by combining these devices appropriately.

The image processing condition in the image processing section 50 and the reading condition in the fine scan are set in the setup section 52.

The setup section 52 creates a density histogram of the image (frame) of interest using the prescanned image data having been processed in the data processing section 48 as well as calculates image characteristic quantities such as average density, large area transmission density (LATD), minimum and maximum densities (highlight and shadow; specified frequency point in terms of % in the density histogram), maximum frequency point of the density histogram and the like of the image.

The setup section 52 sets an image processing to be executed, together with the processing condition thereof and a reading condition in the fine scan, using the above-mentioned density histogram and image characteristic quantities. The image processing and the image processing condition thereof may be set by a known method in accordance with the density histogram, the image characteristic quantities and in response to an operator's command using the keyboard 18a and the like. The thus set image processing condition is appropriately adjusted through an adjustment operation using the keyboard 18a or the mouse 18b in verification or the like.

In the color digital printer 10, the reading conditions of the fine scan, specifically, whether the light quantity adjusting filter 26 is inserted in the light path L or not, storage time of each line CCD sensor (34R, 34G and 34B) of the image sensor 34, analog gain on the amplifier 36 (hereinafter called as gain) and the like are basically set using the density histogram and the image characteristic quantities, as described below.

In the color digital printer 10 illustrated in FIG. 1, the reference reading conditions (hereinafter called as reference conditions) of the fine scan on the storage time of each line CCD sensor (34R, 34G and 342) of the image sensor 34 and the gain on the amplifier 36 are set. These conditions may be the same as or different from those of the prescan. It goes without saying that the above-mentioned storage time is set such that the output of the image sensor 34 will not be saturated.

The setup section 52, first, sets the reference conditions for the image sensor 34 and the amplifier 36 and, next, determines based on the film type read with the bar code reader 38 whether the light quantity adjusting filter 26 is to be inserted in the light path L or not.

In the present embodiment, as described above, the light quantity adjustment in image reading is performed by an electric method in which the storage time of each line CCD sensor (34R, 34G and 34B) of the image sensor 34 and the gain on the amplifier 36 are adjusted, as well as whether the light quantity adjusting filter 26 is to be inserted in the light path L or not is determined based on the film type read with the bar code reader 38. In other words, in the present embodiment, the light quantity adjustment for image reading is performed in accordance with the type of the film F in a way that, when the film F is a color reversal film, the light quantity adjusting filter 26 is not inserted in the light path L whereas, when the film F is a color negative film, the light quantity adjusting filter 26 is inserted in the light path L, whereupon the thus performed light quantity adjustment, the adjustment of the reading condition in the image sensor 34 and the adjustment of the gain on the amplifier 36 allow the image signals to be inputted into the A/D converter 37 to be of appropriate values based on the film type.

Operations of the scanner 12 and the processing apparatus 14 will now be described whereby the present embodiment will be described in detail.

The operator who was requested to produce a print of the film F loads the scanner 12 with the carrier 30 which is adapted for the film F, sets the film F (or the cartridge thereof) in a specified position on the carrier 30, enters the necessary information such as the size of the print to be produced, and thereafter keys in a command for starting print production.

In response to the start command, in the scanner 12, insertion/withdrawal of the light quantity adjusting filter 26, the storage time of the image sensor 34 (line CCD sensors 34R, 34G and 34B) and the gain of the amplifier 36 are set in accordance with the reading conditions for prescan; thereafter, the carrier 30 transports the film F in the auxiliary scanning direction at the transport rate corresponding to prescan to start prescan; the reading light which has been adjusted of the quantity thereof and diffused with the diffuser box 28 is allowed to be incident in the reading position; the film F is subjected to slit scan in the reading position while it is transported for slit scanning; and the projected light is focused on the image sensor 34 whereupon the image recorded on the film F is separated into R, G and B and captured photoelectrically.

In the present invention, both prescan and fine scan may be performed frame by frame. Alternatively, all frames may successively be subjected to prescan and fine scan. If desired, prescan and fine scan may continuously be performed on frame groups each consisting of a given number of frames. On the pages that follow, the case of reading the image in one frame is described for the sake of simplicity.

The image signals outputted from the image sensor 34 by prescan are amplified by the amplifier 36 and sent to the A/D converter 37, where they are converted to digital image signals.

The digital image signals are subjected to the specified processing in the data processing section 48 into prescanned data, that is, digital image data.

The prescanned data is supplied to the setup section 52 where, based on the prescanned data, a density histogram of the image is constructed; image characteristic quantities such as the minimum and maximum densities are calculated; and image processing to be executed and the image processing conditions thereof are set to be finally set in a specified site (hardware) in the image processing section 50.

Moreover, the setup section 52 sets the reading conditions for fine scan from the density histogram and the image characteristic quantities as described above. In other words, the storage time in each line CCD sensor (34R, 34G and 34B) of the image sensor 34 is determined such that the maximum value of the signals inputted into the A/D converter 37 becomes the specified one or the gain on the amplifier 36 is determined. The thus determined reading conditions are supplied to a specified site in the scanner 12.

If verification is to be performed, after the image processing condition is set in the image processing section 50, the prescanned data is supplied to the image processing section 50 where it is subjected to the thus set image processing condition, converted to a suitable form for representation on the display 20 and is thereafter represented as a simulated image on the display 20.

Looking at the representation on the display 20, the operator verifies the image and optionally adjusts the color, density, gradation and other features of the image by manipulating keys on the keyboard 18a or the like.

In response to the entered inputs for this adjustment, the setup section 52 adjusts the image processing condition set in the image processing section 50. Then, the image represented on the display 20 also varies in response to this adjustment entered by the operator.

If the operator concludes that the image represented on the display is appropriate (verification OK), the operator manipulates the keyboard 18a or the like to give a command for print start, whereupon the image processing condition is finalized.

If no image verification is to be performed, the image processing condition is finalized at the point of time when the setup section 52 ends setting of the image processing condition in the image processing section 50. It is preferable that whether the verification is necessary or not can be selected as a mode or the like.

When the image processing condition is set, fine scan gets started. At first, the storage time of each line CCD sensor (34R, 34G and 34B) of the image sensor 34 is set in accordance with the reading condition of fine scan which has been supplied from the setup section 52; and the gain of the amplifier 36 is set. Next, the carrier 30 starts to transport the film F at a transport speed corresponding to fine scan. Fine scan is performed in essentially the same manner as prescan except for the above conditions and the reading pixel density, whereupon the reading light is issued from the light source 22, adjusted of the light quantity thereof by means of the light quantity adjusting filter 26 in accordance with the set condition, diffused with the diffuser box 28 and allowed to be incident on the reading position where the film F is slit scanned by the reading light while it is transported in the auxiliary scanning direction being held in the reading position by the carrier 30.

When the film F is a color reversal film, the thus obtained projected light from the film F has an ordinary spectral distribution since the light quantity adjusting filter 26 is not inserted in the light path L whereas, when the film F is a color negative film, as described above, the projected light has a spectral distribution with the base density of the color negative film being corrected by inserting the light quantity adjusting filter 26 in the light path L.

Figure 7:
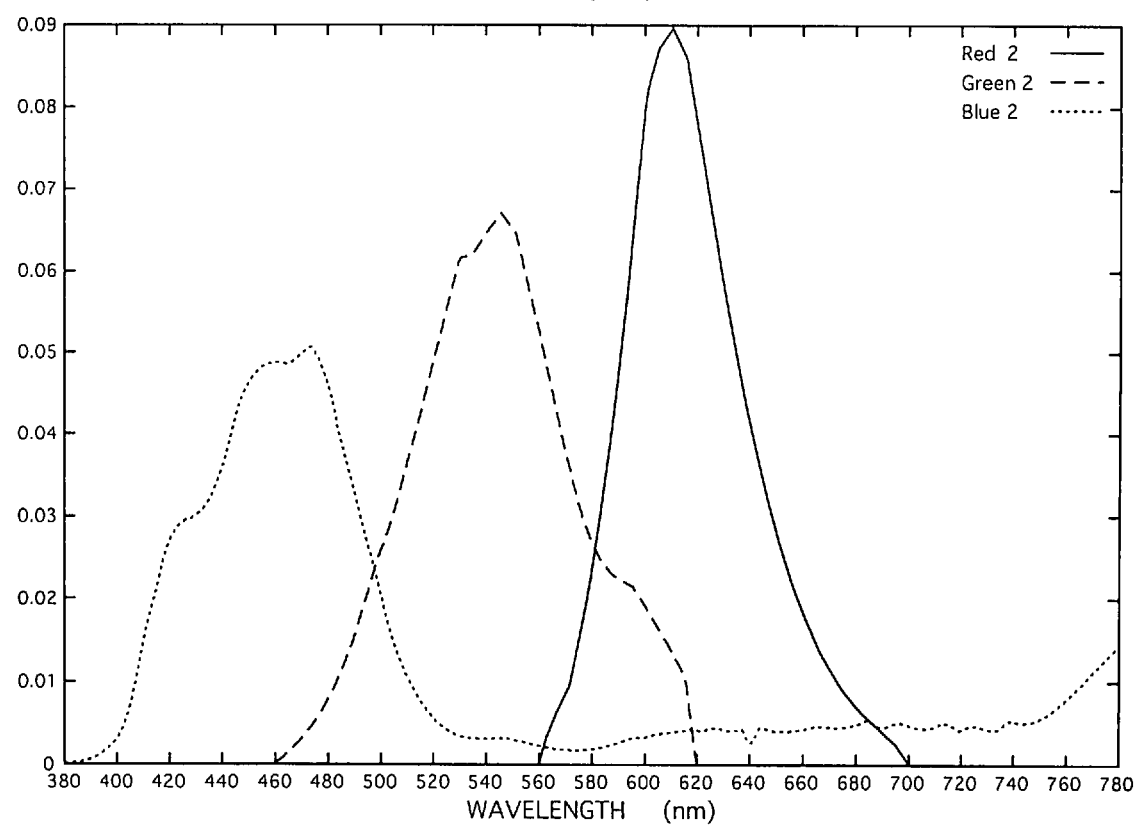
FIG. 7 is a graph showing spectral sensitivity characteristic obtained by reading an image recorded on color negative film formed on a base having the spectral transmittance shown in FIG. 6.
Figure 10:
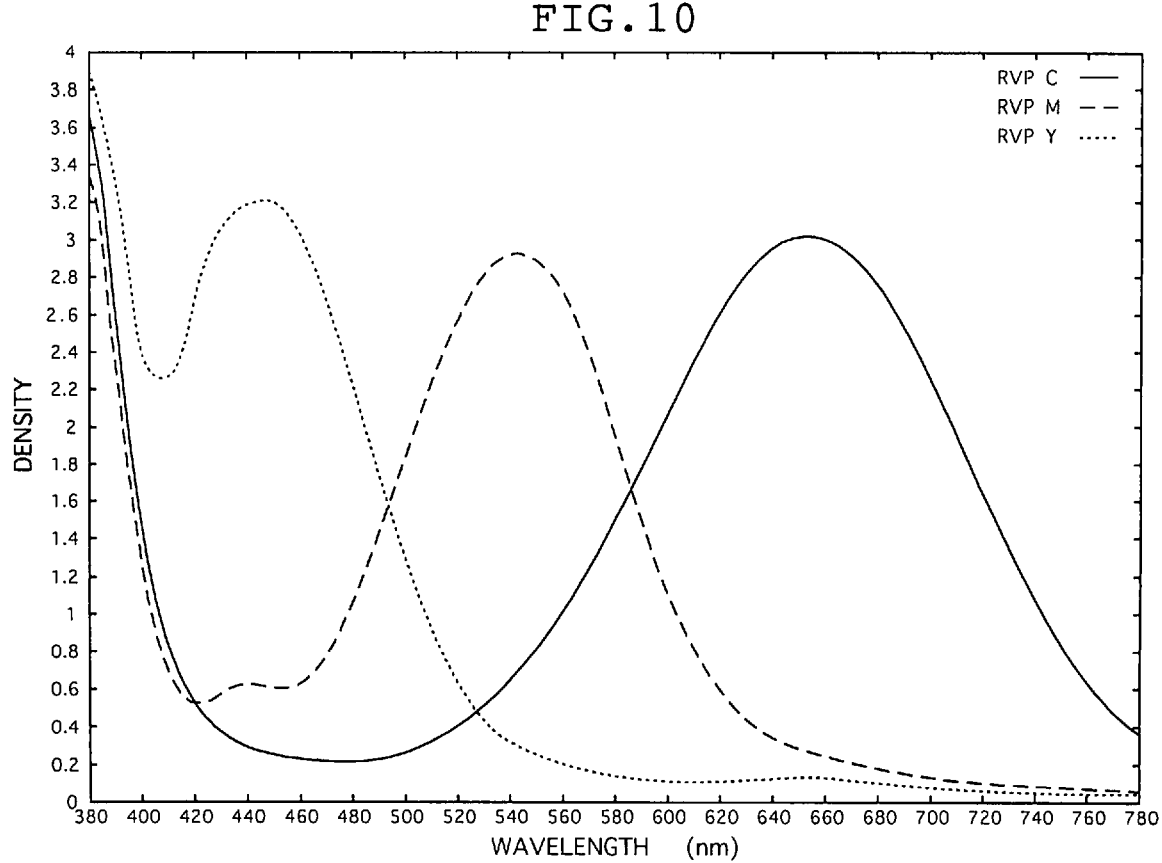
FIG. 10 is a graph showing an example of spectral densities of a color reversal film.
Figure 13:
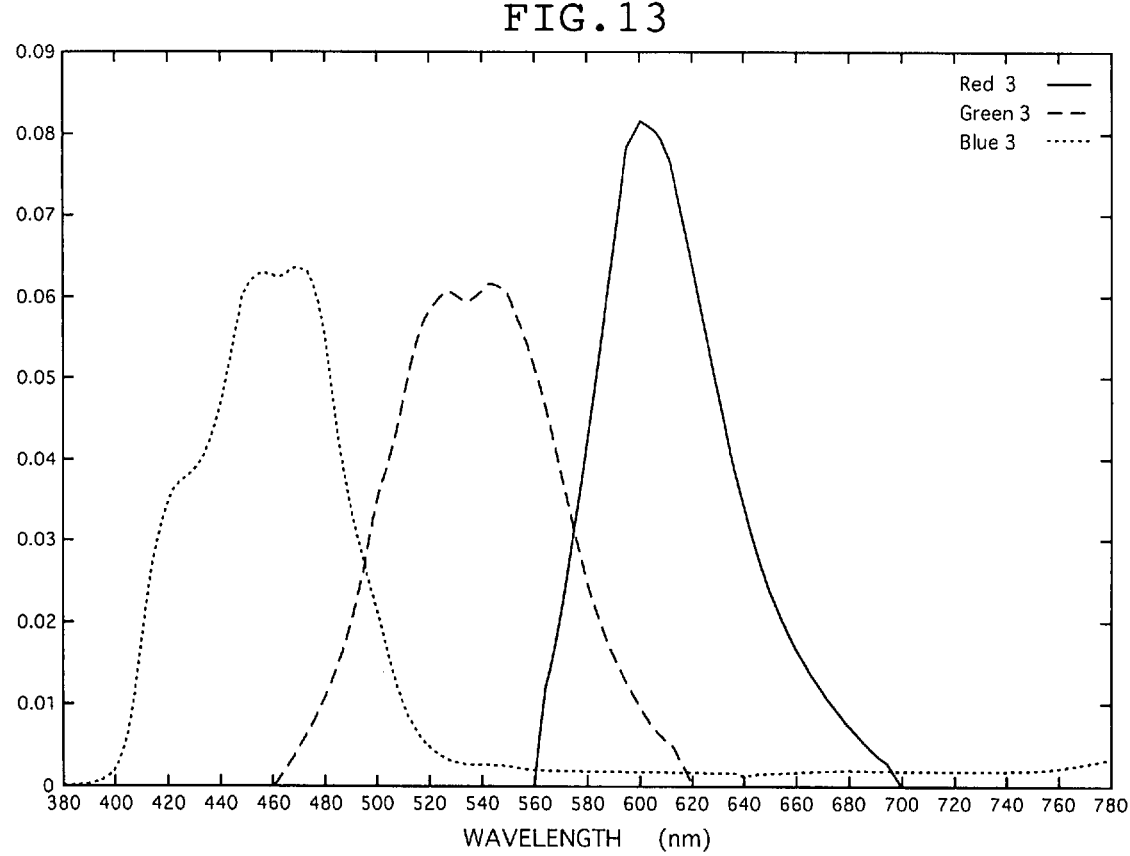
FIG. 13 is a graph showing a revised spectral distribution derived from a spectral distribution shown in FIG. 7 when light quantity balance of a color negative film is adjusted with a light quantity adjusting filter 26.

In other words, when the film F is a color reversal film, the projected light from the film F has a spectral distribution as shown in FIG. 10 whereas, when the film F is a color negative film, the light quantity adjusting filter 26 is inserted in the light path L to perform a light quantity adjustment so that the spectral distribution of the projected light is different from that shown in FIG. 7 and is shown in FIG. 13.

The projected light from the film F is focussed on the image sensor 34 with the imaging lens unit 32 and read with the set storage time. The image signals outputted from the image sensor 34 are amplified in accordance with the gain set in the amplifier 36 to produce the image signals of which the maximum value becomes the specified value, and supplied to the A/D converter 37 where the image signals are converted to the digital form to be sent to the processing apparatus 14.

The digital image signals are processed in the data processing section 48 of the processing apparatus 14 into digital image data (fine scan data), processed imagewise in the image processing section 50 in accordance with the finalized image processing condition, converted into the suitable image data for image recording at the printer 16 and then outputted to the printer 16.

The printer 16 comprises a printer (printing device) that records a latent image on a light-sensitive material (photographic paper) by exposing it in accordance with the supplied image data and a processor (developing device) that performs specified processing steps on the exposed light-sensitive material and which outputs it as a print. To give one example of the printer's operation, the light-sensitive material is cut to a specified length in accordance with the size of the final print; thereafter, the printer records a back print and three light beams for exposure to red (R), green (G) and blue (B) in accordance with the spectral sensitivity characteristics of the light-sensitive material are modulated in accordance with the image data outputted from the processing apparatus 14; the three modulated light beams are deflected in the main scanning direction while, at the same time, the light-sensitive material is transported in the auxiliary scanning direction perpendicular to the main scanning direction so as to record a latent image by two-dimensional scan exposure with the above-mentioned light beams. The light-sensitive material bearing the latent image is then supplied to the processor. Receiving the light-sensitive material, the processor performs a specified wet development process comprising color development, bleach-fixing and rinsing; the thus processed light-sensitive material is dried to produce a finished print; a plurality of prints thus produced are sorted and stacked in specified units, say, one roll of film.

In the example shown in FIG. 1, light quantity balance among colors in accordance with the original type, that is, the balance of the quantity of the light received by the sensor for a specified time is adjusted by using the light quantity adjusting filter 26 which has the spectral transmittance characteristic as shown in FIG. 3. However, the invention is not limited thereto and a device for changing the spectral distribution itself of the reading light in accordance with the original type may be provided to adjust the spectral distribution characteristic of the reading light to be uniform among colors; for example, the peak value of the spectral distribution may be changed or adjusted. In other words, the spectral sensitivity characteristic of the optical system starting from the light source 22 up to the image sensor 34 may be changed or adjusted according to the original type. For example, the spectral distribution may be adjusted to be uniform among colors or the peak value of the spectral distribution may be adjusted to be uniform among colors by cutting a specified wavelength region with a spectral sensitivity adjusting device such as a notch filter or the like. Also in this case, it is preferable that the spectral sensitivity distribution (spectral sensitivity characteristic) of the optical system in its entirety starting from the light source 22 up to the image sensor 34 is changed or adjusted.

Moreover, when the above-mentioned notch filter for peak value adjustment of the spectral distribution is used in addition to the above-mentioned light quantity adjusting filter 26, the operation is performed as described below.

Figure 9:
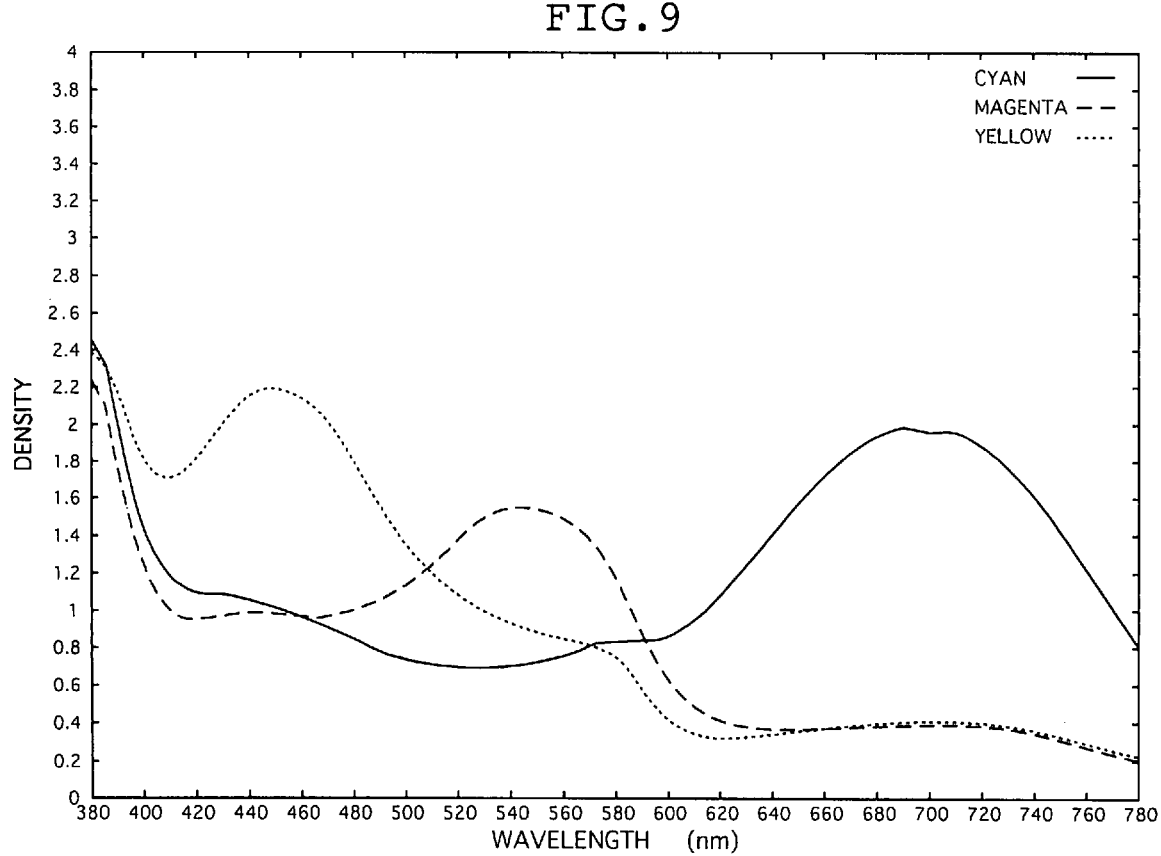
FIG. 9 is a graph showing an example of spectral densities of a color negative film.
Figure 11:
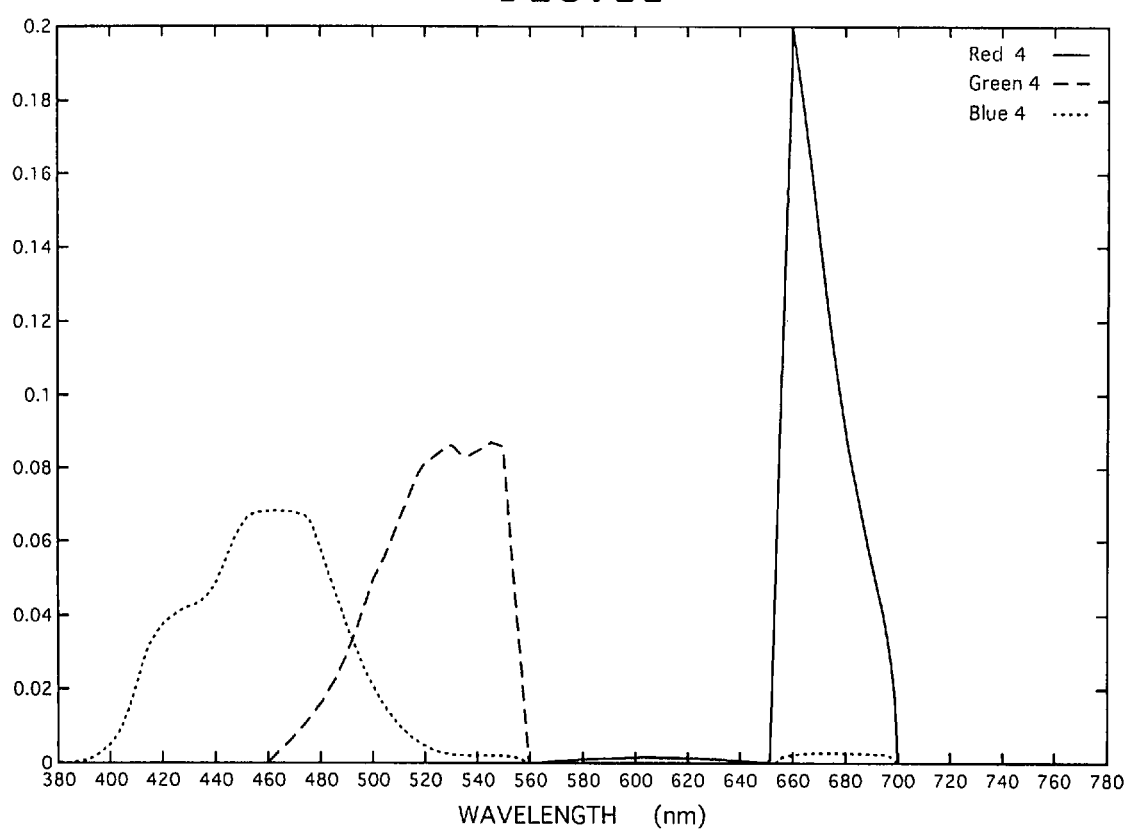
FIG. 11 is a graph showing a result of using notch filters for adjusting spectral densities of a color negative film shown in FIG. 9.
Figure 12:
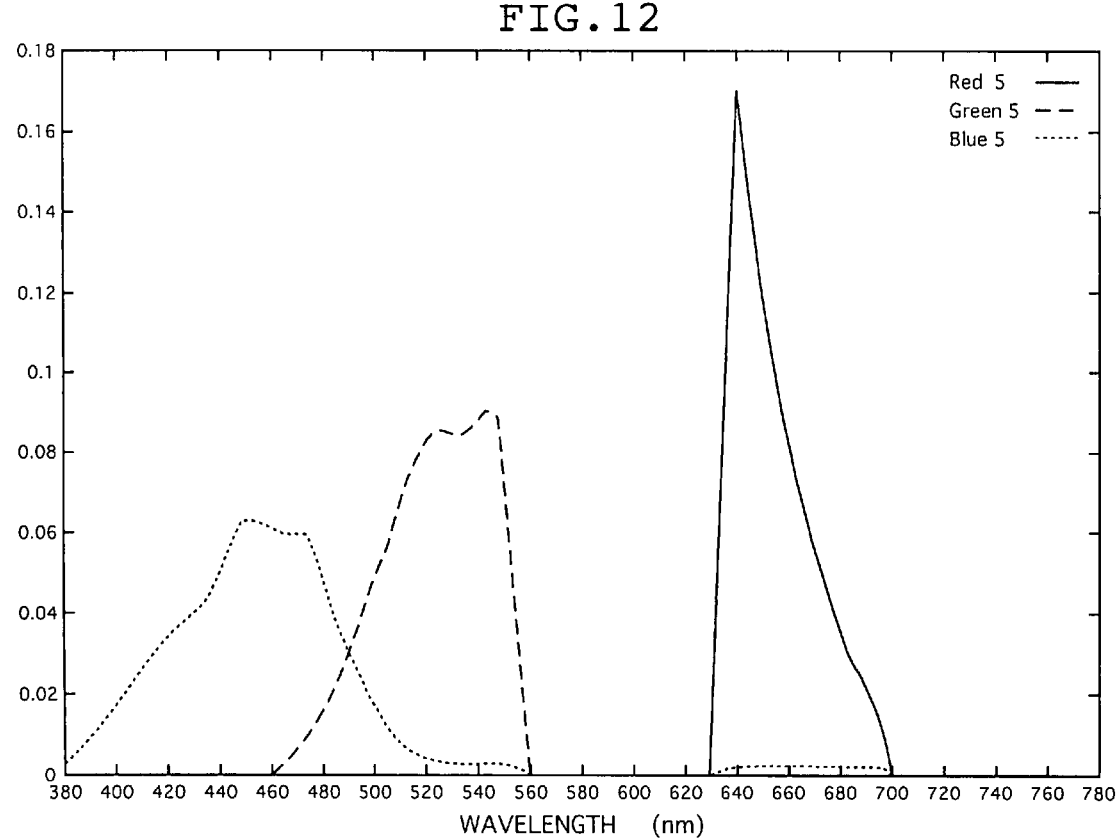
FIG. 12 is a graph showing a result of using notch filters for adjusting spectral densities of a color reversal film shown in FIG. 10.

In accordance with the insertion/withdrawal of the above-mentioned light quantity adjusting filter 26 (i.e., film type being color negative film or color reversal film), a notch filter for cutting 550 to 650 nm for the color negative film as shown in FIG. 9 or a notch filter for cutting 560 to 630 nm for the color reversal film as shown in FIG. 10 is inserted in the light path L. By this step, the peak values of spectral distributions of the color negative and color reversal films are shifted from those shown in FIGS. 9 and 10 to those shown in FIGS. 11 and 12, respectively.

Illustrated in FIG. 14 is a result of comparison between three cases: when B (blue) of the color negative film has the original spectral sensitivity (solid line A); when it is not subjected to light quantity balance adjustment with the light quantity adjusting filter 26 (dashed line B); and when it is subjected to light quantity balance adjustment (dotted line C).

While the image reading method and the image reading apparatus adopting the method have been described in detail through various examples, it should be noted that the invention is by no means limited to the foregoing embodiments and various improvements and modifications may of course be made without departing from the scope and spirit of the invention.

For example, in the above embodiment, the type of the film F of which the image is to be read is judged by reading the bar code (DX code) recorded optically on the film F. However, other methods such as a method for judging the type of film F through the type of carrier 30 which holds the film F, another method for judging the type of film F based on the base density of a space between frames of the film F which is read with the bar code reader 38 may be available.

Moreover, the operator may directly enter the result which the operator judged on the type of the film F. Furthermore, the type of film F may be judged by reading the image of the film F and analyzing the thus read image.

In the above embodiment, as one exemplary operation of the insertion/withdrawal of the light quantity adjusting filter 261 in/from the light path L, it is shown that the filter driver 26A moves the filter 26 slidably. However, various other methods such as the case that the light quantity adjusting filter 26 is fixed to a disk which is rotated and so forth are available. Moreover, the similar construction as above can be adopted for a notch filter operation of insertion/withdrawal corresponding to the film type (color negative film or color reversal film). Furthermore, the above-mentioned light quantity adjusting filter and notch filter can be integrated with a color temperature adjusting device of the light source or the like.

In the above embodiment, the insertion/withdrawal of the light quantity adjusting filter 26 in/from the light path L is arranged such that the filter is inserted when the color negative film is used while the filter is not inserted when the color reversal film is used, whereupon the apparatus is simplified.

As described above in detail, according to the invention, when the image is photoelectrically read, the high-precision image reading can be attained without creating a muddy color. Moreover, it is an advantage that the image reading conditions need not be changed, even when the film types are changed.

What is claimed is:

1. An image reading method, comprising the steps of:
   reading photoelectrically an original image with an image sensor by separating it into three primary colors; and
   converting image signals of the three primary colors outputted from the image sensor into digital signals,
   wherein a light quantity of light which is incident on said image sensor is balanced among colors in accordance with an original type by adjusting said light quantity of light which is issued from a light source and incident on an original in accordance with the original type.

2. The image reading method according to claim 1, wherein balancing said light quantity among colors is formed by changing an optical balance in an optical system from the light source to the image sensor including the original.

3. The image reading method according to claim 1, wherein said original type includes at least a color negative film and a color reversal film.

4. The image reading method according to claim 1, wherein said light quantity of light which is incident on said image sensor is balanced with every color in accordance with the original type.

5. The image reading method according to claim 1, wherein said light quantity of light which is incident on said image sensor is balanced with every color among said three primary colors so as to reduce differences of original types.

6. An image reading apparatus comprising:
   an image sensor which separates into three primary colors light bearing an image of an original and photoelectrically reads said light;
   original type acquiring means for detecting or setting an original type of said original; and
   light quantity balance adjusting means for catching among colors a balance of light quantity of said light that is incident on said image sensor in accordance with the original type obtained by said original type acquiring means by adjusting light quantity of light which is issued from a light source and incident on an original in accordance with the original type, said light quantity balance adjusting means being provided between said light source and said original in accordance with the original type.

7. The image reading apparatus according to claim 6, wherein said light quantity balance adjusting means changes an optical balance in an optical system from the light source to the image sensor including said original.

8. The image reading apparatus according to claim 6, wherein said light quantity balance adjusting means changes an optical balance in an optical system from the light source to the image sensor including said original and decreases color mixing in the three primary colors.

9. The image reading apparatus according to claim 6, wherein said light quantity balance adjusting means includes an optical filter.

10. The image reading apparatus according to claim 6, wherein said original type includes at least a color negative film and a color reversal film.

11. The image reading apparatus according to claim 6, wherein said light quantity balance adjusting means will not operate in a reference type of the original.

12. The image reading apparatus according to claim 6, further comprising:
   spectral sensitivity changing means for changing a spectral sensitivity distribution of said light in accordance with the original type after the balance of the light quantity is adjusted among colors, as well as said respective means.

13. The image reading apparatus according to claim 6, wherein said light quantity balance adjusting means catches with every color the balance of the light quantity of said light that is incident on said image sensor in accordance with the original type.

14. The image reading apparatus according to claim 6, wherein said light quantity balance adjusting means catches said balance of said light quantity of light that is incident on said image sensor with every color among said three primary colors so as to reduce differences of original types.

15. The image reading apparatus according to claim 12, wherein said spectral sensitivity changing means is peak value changing means of said spectral sensitivity distribution in accordance with the original type.

16. The image reading apparatus according to claim 15, wherein said peak value changing means of said spectral sensitivity distribution changes a peak value of the spectral sensitivity distribution in an optical system from the light source to the image sensor including said original.

17. The image reading apparatus according to claim 15, wherein said light quantity balance adjusting means and said peak value changing means of said spectral sensitivity distribution are integrated into a single optical unit.

18. The image reading apparatus according to claim 15, wherein said peak value changing means of said spectral sensitivity distribution will not operate in a reference type of the original.

19. An image reading method, comprising the steps of:
   reading photoelectrically an original image with an image sensor by separating it into three primary colors;
   converting image signals of the three primary colors outputted from the image sensor into digital signals;
   emitting a quantity of light from a light source through a light quantity adjusting device to an original; and
   balancing said quantity of light which is incident on said image sensor among colors by adjusting said quantity of light which is issued from the light source and incident on the original with said light quantity adjusting device in accordance with a type of the original.

20. The image reading method according to claim 19, wherein said light quantity of light which is incident on said image sensor is balanced by said light quantity adjusting device with every color among said three primary colors so as to reduce differences of types of originals.

* * * * *